UNITED STATES PATENT OFFICE.

CHARLES S. PHILIPS, OF BROOKLYN, NEW YORK.

AGING AND MATURING COFFEE.

SPECIFICATION forming part of Letters Patent No. 250,099, dated November 29, 1881.

Application filed October 11, 1881. (No model.)

*To all whom it may concern:*

Be it known that I, CHARLES S. PHILIPS, of the city of Brooklyn, county of Kings, State of New York, have invented certain new and useful Improvements in the Process of Treating Coffee for the Purpose of Maturing it and Improving its Quality and Flavor, of which the following is a full, clear, concise, and exact description, such as will enable others skilled in the art to which my invention appertains to make use of and practice the same.

The object of my invention is to facilitate the elimination of the rank, undesirable elements of the coffee by oxidation or ozonation during fermentation.

My invention consists in first fermenting the coffee for a sufficient length of time to soften the berry and wholly or partially expel the rank elements, and during the last one, two, or three days of fermentation applying oxygen or ozone to the coffee simultaneously with the fermenting process. The coffee may be placed in bulk or in bags within a room and heated with a moist atmosphere at a temperature ranging from 60° to 90° Fahrenheit, to induce fermentation, and after fermentation has been established the heat may be increased to a temperature ranging from 90° to 110° Fahrenheit, and the process continued for from two to seventeen days, according to the rankness of the coffee. After fermentation has been carried on for this length of time, I apply oxygen or ozone to it, simultaneously with the fermenting process, for from one to three days.

The oxygen or ozone may be manufactured in any of the well-known ways described in all works on chemistry; but a simple way of producing the oxygen or ozone is to take a lead-lined box or other suitable vessel of any desired size, into which may be placed a few pounds of black oxide of manganese, onto which should be poured enough sulphuric acid to produce a mixture of about the consistency of a thin paste, and thoroughly stirred or mixed.

The box or vessel containing the oxidizing agents may be placed in such proximity to or within the room containing the coffee that when a current of air is forced over the mixture, by a Root or other blower, the oxygen or ozone which it gives off will be brought into contact with the coffee.

It is not absolutely necessary to keep a continuous blast over the chemicals at all hours during the last one, two, or three days of fermentation, but it may be so applied when the condition of the coffee appears to the operator to be such as to require it.

To ozonize the coffee it is only necessary that a small quantity of permanganate of potash should occasionally be dropped into the mixture above described.

In this application I do not claim the process of maturing coffee by fermentation alone, as that is claimed in my application filed February 2, 1881; nor do I claim the process of aging and improving the quality of coffee by first fermenting and afterward treating it with oxygen or ozone, as that is claimed in my application filed July 21, 1881; but What I do claim and desire to secure by Letters Patent, is—

The process of treating coffee, which consists in fermenting it from five to twenty days, and during the last one, two, or three days applying oxygen or ozone to it, simultaneously with the fermentation, for the purpose of more thoroughly eliminating the undesirable elements, and improving the quality of the coffee, substantially as described.

CHARLES S. PHILIPS.

Witnesses:
HUBERT A. BANNING,
CHAS. H. HALLOCK.